US008553434B2

(12) United States Patent
Coccia et al.

(10) Patent No.: US 8,553,434 B2
(45) Date of Patent: Oct. 8, 2013

(54) CONTROL METHOD FOR SINGLE-PHASE GRID-CONNECTED LCL INVERTER

(75) Inventors: Antonio Coccia, Baden (CH); Gerardo Escobar, Baden (CH); Leonardo-Augusto Serpa, Zurich (CH); Mikko Paakkinen, Vantaa (FI); Sami Pettersson, Wettingen (CH)

(73) Assignee: ABB Research Ltd, Zurich (CH)

( * ) Notice: Subject to any disclaimer, the term of this patent is extended or adjusted under 35 U.S.C. 154(b) by 211 days.

(21) Appl. No.: 13/030,501

(22) Filed: Feb. 18, 2011

(65) Prior Publication Data

US 2011/0221420 A1 Sep. 15, 2011

(30) Foreign Application Priority Data

Feb. 19, 2010 (EP) .................................. 10154113

(51) Int. Cl.
*H02M 1/12* (2006.01)
*H02M 1/14* (2006.01)

(52) U.S. Cl.
USPC ........................................................... 363/40

(58) Field of Classification Search
USPC ..................................................... 363/39–43
See application file for complete search history.

(56) References Cited

U.S. PATENT DOCUMENTS

| 5,198,972 | A  | * | 3/1993  | Lafuze ............................ | 363/37 |
| 5,818,208 | A  |   | 10/1998 | Othman et al. | |
| 5,847,943 | A  | * | 12/1998 | Vogel ............................. | 363/37 |
| 6,545,887 | B2 | * | 4/2003  | Smedley et al. ............... | 363/89 |
| 7,518,893 | B2 | * | 4/2009  | Ponnaluri et al. .............. | 363/62 |
| 7,542,311 | B2 | * | 6/2009  | Serpa et al. .................... | 363/40 |
| 7,778,052 | B2 |   | 8/2010  | Serpa et al. | |
| 2007/0091653 | A1 | * | 4/2007 | Leggate et al. ................ | 363/41 |
| 2007/0121354 | A1 | * | 5/2007 | Jones et al. .................... | 363/47 |
| 2009/0251933 | A1 | * | 10/2009 | Angerer et al. ................ | 363/71 |

FOREIGN PATENT DOCUMENTS

| CN | 101103513 A | 1/2008 |
| CN | 101517874 A | 8/2009 |

OTHER PUBLICATIONS

European Search Report issued on Jul. 19, 2010.
Roberto Petrella et al., "A Novel Proposal to Increase the Power Factor of Photovoltaic Grid-Connected Converters at Light Loads", Universities Power Engineering Conference International, IEEE, Sep. 1, 2009, pp. 1-5, XP-031647692.

(Continued)

*Primary Examiner* — Jue Zhang
(74) *Attorney, Agent, or Firm* — Buchanan Ingersoll & Rooney PC

(57) ABSTRACT

A method of controlling the grid-side current of a single-phase grid-connected converter having an LCL filter connected between the output of the converter and the grid includes measuring a grid voltage and at least one signal in a group of signals consisting of a grid-side current, a converter-side current and a capacitor voltage, estimating the fundamental component of the grid voltage, forming a grid-side current reference, a converter-side current reference and a capacitor voltage reference for the grid-side current of the LCL filter, forming estimates for the non-measured signals in the group of signals, forming a grid-side current difference term, a converter-side current difference term and a capacitor voltage difference term, and controlling the output voltage of the converter based on the grid voltage, a formed injection term and a formed estimate of the harmonic distortion term to produce a grid side current corresponding to the current reference.

24 Claims, 11 Drawing Sheets

(56) References Cited

OTHER PUBLICATIONS

Erika Twining et al., "Grid Current Regulation of a Three-Phase Voltage Source Inverter With an LCL Input Filter", IEEE Transactions on Power Electronics, vol. 18, No. 3, May 1, 2003, pp. 888-895, XP-011096255.

L. A. Serpa et al., "A Modified Direct Power Control Strategy Allowing the Connection of Three-Phase Inverter to the Grid Through LCL Filters", Industry Applications Conference, Fourtieth IAS Annual Meeting, Conference Record of the 2005 Hong Kong, China, IEEE, vol. 1, Oct. 2-6, 2005, pp. 565-571, XP-010842424.

Michael Lindgren et al., "Control of a Voltage-Source Converter Connected to the Grid Through an LCL Filter—Application to Active Filtering", Proc. IEEE Power Specialists Conference PESC'98, Fukuoka, Japan, 1998, pp. 229-235.

S. Baekof-Kjaer, et al., "Control Aspects of a LCL Grid Connected Green Power Inverter", Proc. Nordic Workshop on Power and Industrial Electronics, NORPIE/2002, Aug. 12-14, 2002, pp. 1-7.

R. Teodorescu et al., "A New Control Structure for Grid-Connected LCL PV Inverters With Zero Steady-State Error and Selective Harmonic Compensation", Proc. IEEE Applied Power Electronics Conference APEC'04, 2004, vol. 1, pp. 580-586.

Mihai Ciobotaru et al., "Control of Single-Stage Single-Phase PV Inverter", Proc. European Power Electronics Conference EPE'05, Dresden, 2005, pp. 1-10.

Mihai Ciobotaru et al., "Control of Single-Stage Single-Phase PV Inverter," EPE Journal, vol. 16, No. 3, pp. 20-26, Sep. 2006.

Vldimir Blasko et al., "A Novel Control to Actively Damp Resonance in Input LC Filter of a Three-Phase Voltage Source Converter", IEEE Transactions on Industry Applications, vol. 33, No. 2, pp. 542-550, Mar./Apr. 1997.

Marco Liserre et al., "Stability of Photovoltaic and Wind Turbine Grid-Connected Inverters for a Large Set of Grid Impedance Values", IEEE Transactions on Power Electronics, vol. 21, No. 1, pp. 263-272, Jan. 2006.

A. Papavasiliou et al., "Current Control of a Voltage Source Inverter Connected to the Grid Via LCL Filter," Proc. IEEE Power Electronics Specialists Conf. PESC'07, Jun. 17-21, 2007, pp. 2379-2384.

L. A. Serpa et al., "A Modified Direct Power Control Strategy Allowing the Connection of Three-Phase Inverters to the Grid Through LCL Filters", IEEE Transactions on Industry Applications, vol. 43, No. 5, Sep./Oct. 2007, pp. 1388-1400.

Bernard Friedland, "The Control Handbook", IEEE CRC Press Inc., USA, 1996, pp. 607-618.

Alessandro Astolfi et al., "Immersion and Invariance: A New Tool for Stabilization and Adaptive Control of Nonlinear Systems", IEEE Transactions on Automatic Control, vol. 48, No. 4, pp. 590-606, Apr. 2003.

B. A. Francis et al., "The Internal Model Principle for Linear Multivariable Regulators", Applied Mathematics and Optimization, vol. 2, No. 2, pp. 170-194, 1975.

Chinese Office Action with Chinese Search Report issued Apr. 26, 2013 by Chinese Patent Office in Chinese Patent Application No. 201110042838.3 and English language translation of Chinese Office Action and Chinese Search Report (14 pages).

* cited by examiner

CONTROL METHOD FOR SINGLE-PHASE GRID-CONNECTED LCL INVERTER

RELATED APPLICATIONS

This application claims priority under 35 U.S.C. §119 to European Patent Application No. 10154113.4 filed in Europe on Feb. 19, 2010, the entire content of which is hereby incorporated by reference in its entirety.

FIELD

The present disclosure relates to controlling grid-connected converters. More particularly, the present disclosure relates to an arrangement in which an LCL filter is used as the interface between a voltage source inverter (VSI) and the grid.

BACKGROUND INFORMATION

The use of power converters in grid-connected applications has become a popular subject in the last few years. In distributed generation systems, these power converters act as active interfaces, and can be composed of a VSI connected to the grid by means of a simple series L filter. However, to avoid injection of switching harmonics, this solution is limited to high switching frequencies. In contrast, it has been observed that the use of inverters with LCL filters can achieve reduced levels of harmonic distortion, even at low switching frequencies and with a smaller inductance. Therefore, they have become a more compact and economically more convenient solution. This makes the inverters with LCL filters good candidates for higher power applications where the switching frequency is limited. The applicability of these systems includes static VAR compensators, uninterruptible power systems, power flow compensators, and distributed generation system interfaces (photovoltaic, wind power, micro turbine, fuel cell, etc.), among others. In distributed generation applications, the primary energy source is connected to the grid by means of a power converter, such as a voltage source inverter (VSI), and a filter. Originally, an L filter was used, but recently LCL filter-based converters are becoming more popular due to their improved characteristics that allow them to comply with the increasingly more restrictive standards. These systems, however, present more complex dynamics than L filter-based converters. Besides the increased complexity of the LCL filter, a resonance arises, which compromises the stability of the system and makes the system more susceptible to grid disturbances. Therefore, more sophisticated controller methods are desired to guarantee stability with enhanced disturbance rejection capability. In particular, the control schemes should be able to alleviate the harmonics distortion which has become an almost mandatory feature for the controller design. Simultaneously, the implementation of such controllers should be kept as simple as possible and minimize or dispense with the requirement of additional sensors to keep the implementation cost comparable to known L filter-based converters.

The present disclosure makes reference to thirteen (13) documents identified in the References section below. Each of these documents is incorporated by reference in their entireties. For conciseness, the documents are identified herein with respect to the numeral assigned thereto in the References section below. In document [1], the authors present a comparison between PV inverters with an L filter and with an LCL filter. They show that with both schemes the low frequency harmonics attenuation is more and less the same. However, in the LCL filter, the switching harmonics are better attenuated. For instance, the LCL filter makes it possible to comply with EMC standards with relatively low switching frequencies. The authors observe that in LCL filters control becomes more expensive and complex. The proposed controller requires measurement of all variables.

In document [2], the authors propose to use similar controllers for the LCL filter as in the L filter inverter. They consider that at low frequencies the response between a single L filter and an LCL filter is similar. The authors use PI controllers for both the current and the DC link voltage controllers. Moreover, they propose to add a passive resistor in parallel with the outer inductor to somehow improve stability at the cost of dissipation losses. The inverter is controlled to emulate a resistor so that the current will be a scaled version of the grid voltage. However, if the grid voltage is distorted, then the current will also be distorted. The voltage outer loop is used to produce the current reference, and thus its bandwidth is made very small to avoid further distortion reinjection.

In document [3], the authors present a proportional-plus-resonant (P+R) controller. They measure the grid-side current and the capacitor current. This is for a three-phase system. They study the effect of the harmonic distortion in the grid voltage, however, only to propose to tune the controller to somehow alleviate this issue.

In document [4], the authors propose a controller which requires that only the current on the inverter side and the grid voltage are measured. The scheme is based on a P+R controller for the stability and tracking of the fundamental, and includes a bank of harmonic oscillators for the compensation of harmonic distortion (HC). However, the proposed scheme controls the inverter-side current rather than the grid current, and thus it may experience some inaccuracies on the delivered output current. The authors also propose to include the delay due to sampling, which apparently improves stability. Then, in documents [5] to [6], they use basically the same controller, except that this time they measure the current on the grid side. However, direct application of this controller to the grid current may entail stability issues as there is missing damping that cannot be injected with a simple P+R controller.

It is clear that with the LCL filter, a resonance is introduced, and thus efforts should be made to somehow damp this resonance and preserve stability. This process of damping the resonance is referred to as active damping injection. Different approaches for active damping injection in LCL filters have been proposed so far in documents [7] to [10].

In document [7], the authors propose the use of a lead-lag compensator loop on the capacitor voltage to actively damp the resonance of the LCL filter. Other works use the feedback of the capacitor current (document [10]), and some others require the feedback of all state variables of the LCL filter (document [9]). However, the use of additional measurements increases the cost as more sensors are required. The introduction of complex poles and complex zeros, as well as the introduction of a notch filter around the resonance, are also other techniques reported in document [8]. However, as noticed by the authors, the tuning of such schemes is sensitive to system parameters, and the active damping injection could become ineffective in case of a weak grid.

In document [8], the authors propose the use of a P+R as the current controller. They realize that in the low frequencies range, the stability conditions are imposed mainly by the P+R controller. However, at high frequencies, stability is more related to the damping of the LCL filter itself, with very small influence from the P+R controller. This motivates the use of mechanisms to insert extra damping so stability can be guaranteed. The authors propose to inject active damping by inserting two zeros around the resonance frequency. Moreover, in the case that the converter current is the measured variable, they propose to include two active damping poles to somehow compensate the resonant zeros of the system. They also study another method that consists of inserting a notch filter around the system resonance. The authors show that in case of a weak grid, the active damping injection could be ineffective, and thus provisions must be taken to properly tune the controller.

In document [9], the authors propose a controller which is a cascade interconnection of PI and deadbeat controllers. The PI is used as an outer loop to control the grid current, delivering the reference for the inverter-side current, which is then stabilized by the deadbeat controller. The controller requires the measurements of all variables in the LCL filter, and thus their feedback on the controller represents the stabilization mechanism. The effect of the harmonic distortion in the grid voltage is studied, but no harmonic mechanism is included to overcome this issue. Rather, this compensation is left to the frequency characteristics of the cascade controller.

In document [10], the authors propose modifications to the conventional DPC control to consider the LCL filter. They propose to alleviate the resonance issue by injecting active damping. For this purpose, the capacitor current is measured in addition to the converter-side current. A harmonic compensation scheme is also presented, which is based on the synchronous reference frame representations of signals.

SUMMARY

An exemplary embodiment of the present disclosure provides a method of controlling the grid-side current of a single-phase grid-connected converter having an LCL filter connected between an output of the converter and the grid. The method includes the steps of: measuring a grid voltage ($v_S$) and at least one signal in a group of signals consisting of a grid-side current ($i_0$), a converter-side current ($i_1$) and a capacitor voltage ($v_{C0}$); estimating a fundamental component ($v_{S,1}$) of the grid voltage ($v_S$); forming a grid-side current reference ($i_0^*$), a converter-side current reference ($i_1^*$) and a capacitor voltage reference ($v_{C0}^*$) for the grid-side current of the LCL filter using the estimated fundamental component of the grid voltage ($v_{S,1}$); forming estimates for any of the non-measured signals in said group of signals; forming a grid-side current difference term ($\tilde{i}_0$), a converter-side current difference term ($\tilde{i}_1$) and a capacitor voltage difference term ($\tilde{v}_{C0}$) from the differences between references and the measured and/or estimated values of said signals; forming an injection term for damping the resonance of the LCL filter by using an active damping injection mechanism (ADI), in which the grid-side current difference term ($\tilde{i}_0$), the converter-side current difference term ($\tilde{i}_1$) and the capacitor voltage difference term ($\tilde{v}_{C0}$) are used; forming an estimate of a harmonic distortion term ($\hat{\phi}$) using the grid-side current difference term ($\tilde{i}_0$); and controlling the output voltage (e) of the converter on the basis of the grid voltage, formed injection term and formed estimate of the harmonic distortion term ($\hat{\phi}$) to produce a grid side ($i_0$) current corresponding to the current reference.

An exemplary embodiment provides a converter in association with a LCL filter. The exemplary converter includes: means for measuring a grid voltage ($v_S$) and at least one signal in a group of signals consisting of a grid-side current ($i_0$), a converter-side current ($i_1$) and a capacitor voltage ($v_{C0}$); means for estimating a fundamental component ($v_{S,1}$) of the grid voltage ($v_S$); means for forming a grid-side current reference ($i_0^*$), a converter-side current reference ($i_1^*$) and a capacitor voltage reference ($v_{C0}^*$) for the grid-side current of the LCL filter using the estimated fundamental component of the grid voltage ($v_{S,1}$); means for forming estimates for any of the non-measured signals in said group of signals; means for forming a grid-side current difference term ($\tilde{i}_0$), a converter-side current difference term ($\tilde{i}_1$) and a capacitor voltage difference term ($\tilde{v}_{C0}$) from the differences between the references and measured/estimated values of said signals; means for forming an injection term for damping the resonance of the LCL filter by using an active damping injection mechanism (ADI), in which the grid-side current difference term ($\tilde{i}_0$), the converter-side current difference term ($\tilde{i}_1$) and the capacitor voltage difference term ($\tilde{v}_{C0}$) are used; means for forming an estimate of a harmonic distortion term ($\hat{\phi}$) using the grid-side current difference term ($\tilde{i}_0$); and means for controlling the output voltage (e) of the converter on the basis of the grid voltage, formed injection term and formed estimate of the harmonic distortion term ($\hat{\phi}$) for producing a grid side ($i_0$) current corresponding to the current reference.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
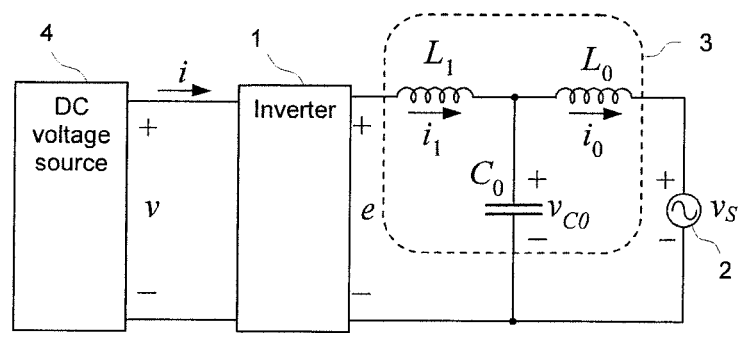
FIG. 1 illustrates a single-phase inverter grid-connected through an LCL filter, according to an exemplary embodiment of the present disclosure.

Exemplary embodiments of the present disclosure provide a method of controlling the grid-side current of a single-phase-grid-connected converter having an LCL filter connected between the output of the converter and the grid. Exemplary embodiments of the present disclosure also provide such a converter in association with a LCL filter.

Exemplary embodiments of the present disclosure are based on the idea of introducing an active damping injection (ADI) and a harmonics compensation mechanism (HCM) to a control method for controlling the current of a single-phase inverter connected to the grid through an LCL filter. The active damping injection (ADI) damps the resonance of the LCL filter, and the harmonic compensation mechanism (HCM) copes with harmonic distortion present in the grid voltage. The control method design is based on the model structure, and thus the information of the dynamical structure is incorporated in the method to allow better dynamical performances. The exemplary method also includes a feedback control loop to inject the required active damping (ADI). According to an exemplary embodiment, not all required quantities are measured. Accordingly, an observer can be used to form estimates of the non-measured signals. For instance, if only the inverter-side current is measured, a reducer order observer (R-OBS) may also be included to reconstruct the non-available states. The R-OBS uses information on the measured inverter-side current, grid voltage, and injected voltage signal produced by the inverter. The use of observed variables in the place of non-available states for control implementation is well supported by the separation principle. The harmonic compensation mechanism (HCM) is formed by a set of quadratic signals generators (QSGs) where the fundamental frequency enters as an input variable.

In accordance with exemplary embodiments of the present disclosure, the grid-side current is controlled directly, which makes the system response less sensitive to disturbances on the grid side, and guarantees a cleaner response of the grid-side current. Furthermore, in accordance with exemplary embodiments of the present disclosure, no additional sensors are required, thus maintaining an easy implementation without extra costs. Moreover, in accordance with exemplary embodiments of the method and converter disclosed herein, the converter functions properly in cases of variation of the fundamental frequency since the harmonic compensation mechanism (HCM) uses the fundamental frequency as an input variable. The value of the fundamental frequency can be generated by an external scheme such as a PLL scheme.

The present disclosure concentrates on the current control of a grid-connected LCL inverter. That is, the control method according to an exemplary embodiment of the present disclosure generates an expression for the injected voltage e, which can then be reproduced by a suitable voltage source inverter (VSI) connected to a DC voltage source and based on an appropriate modulation algorithm. It is important to remark that the technique works for any topology of a voltage source inverter (VSI) able to reproduce signal e and any DC voltage source or primary energy source. The latter includes alternative energy sources with or without an additional converter or passive energy storage elements which are able to provide a constant DC voltage to the voltage source inverter (VSI). Therefore, signal e is considered thorough this document as the control input signal.

FIG. 1 is illustrates an exemplary embodiment of a single-phase inverter 1 connected to a grid 2 through an LCL filter 3. The inverter 1 has a DC voltage source 4 as an energy source. The mathematical model of the grid-connected LCL inverter 1+3 is $$L_1 \dot{i}_1 = -v_{C0} + e$$

$$C_0 \dot{v}_{C0} = i_1 - i_0$$

$$L_0 \dot{i}_0 = v_{C0} - v_S \quad (1)$$

where $i_1$ is the current of inductor $L_1$, also referred to as the inverter-side current or the converter-side current; $i_0$ is the current of inductor $L_0$, also referred as the grid-side current; $v_{C0}$ is the voltage in the capacitor $C_0$; and $v_S$ is the grid voltage.

For control design purposes, the following main assumptions are made:

The parameters $L_1$, $L_0$ and $C_0$ are known and

The grid voltage $v_S$ is a distorted signal containing higher order harmonics of the fundamental frequency $\omega_0$.

Figure 2:
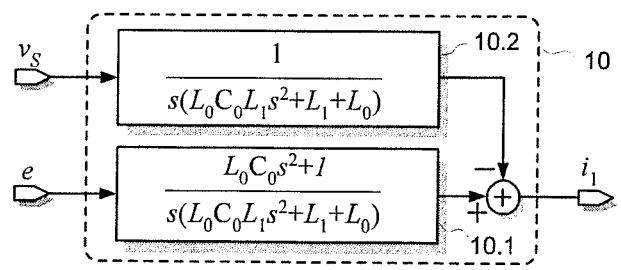
FIG. 2 illustrates a block diagram representation of the LCL filter where the inverter-side current is considered as output, according to an exemplary embodiment of the present disclosure.

A block diagram representation of this system is shown in FIG. 2. It represents a linear time-invariant (LTI) third order system 10 having as a control input the signal e, and as output the signal $i_1$. The grid voltage $v_S$ acts as an external disturbance. The injected voltage e and the grid voltage $v_S$ transfer functions are represented by terms 10.1 and 10.2, respectively, in FIG. 2.

The control objective includes obtaining an expression for the control input e such that the current on the grid side $i_0$ follows a reference $i_0^*$ proportional to the fundamental component of the grid voltage $v_{S,1}$, that is, $$i_0 \to i_0^* \quad (2)$$

$$i_0^* = \frac{P}{v_{S,RMS}^2} v_{S,1}$$

where $v_{S,RMS}$ is the root mean square (RMS) value of $v_S$. The scaling factor $1/v_{S,RMS}^2$ is included to avoid numerical errors only and thus an exact value is not required; scalar P represents the modulation amplitude of the current reference $i_0^*$. In fact, P gives an approximate of the delivered power, and is computed by a suitable outer control loop. In case of alternative energy sources, the outer loop generates P to guarantee operation on the maximum power point (MPP). However, the design of the outer loop is outside the scope of the present disclosure, and thus P is assumed available. It is also assumed that the dynamics on this outer loop are considerably slower than the dynamics of the LCL filter and thus, on the basis of a scale separation principle, the scalar P can be viewed as a constant in the dynamics of the LCL filter.

The tracking objective described above becomes even more challenging, if a grid voltage $v_S$ perturbed with harmonic distortion is considered. This operation condition may cause two issues: first, the current reference $i_0^*$ will be contaminated by harmonics; and second, the distortion of the grid voltage $v_S$ will be propagated to all signals on the LCL filter, for example to the grid-side current $i_0$. To overcome these issues, first a scheme insensitive to harmonic distortion is required to extract only the fundamental component of the grid voltage. Once a clean current reference is guaranteed, a controller can be designed that incorporates a harmonic compensation mechanism to cancel the effect of the harmonic distortion in the grid voltage. As a result, the system will be able to deliver a pure sinusoidal current signal to the grid.

Figure 3:
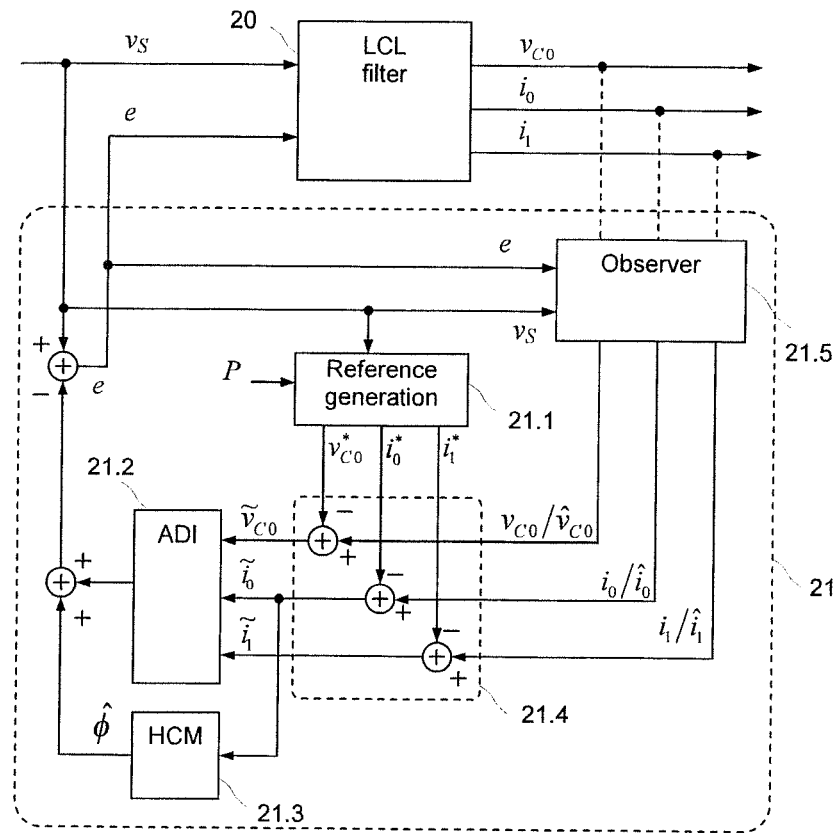
FIG. 3 illustrates a block diagram of an exemplary control method according to the present disclosure.

A block diagram of the control method according to an exemplary embodiment of the present disclosure is shown in FIG. 3. The LCL filter 20 is connected to a control system 21 for carrying out the control method according to the present disclosure. The control method in control system 21 in FIG. 12 includes a reference generation phase 21.1. A grid-side current reference $i_0^*$, a converter-side current reference $i_1^*$ and a capacitor voltage reference $v_{C0}^*$ are formed in the reference generation phase 21.1.

The grid-side current reference $i_0^*$ defined in (1) requires knowledge of the fundamental component $v_{S,1}$, which is not available. Different methods can be used to extract or estimate the fundamental component of the grid voltage $v_S$, and perhaps an estimate of the fundamental frequency. The last is especially useful in the case that the fundamental frequency is not known or varies slowly with time. These are the functions of any phase-locked loop (PLL) scheme, and thus any PLL scheme can be used for this purpose.

Figure 4:
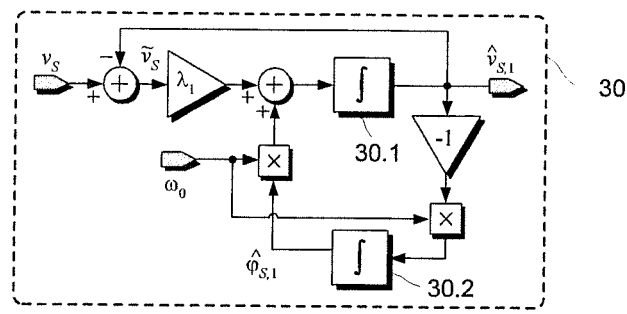
FIG. 4 illustrates an exemplary embodiment of the fundamental quadrature signals generator (F-QSG) which is used to reconstruct the fundamental harmonic component of the grid voltage $\hat{v}_{S,1}$.

In some embodiments a very basic PLL scheme for the estimation of the fundamental component of the grid voltage $v_S$ can be used. It assumes that the fundamental frequency $\omega_0$ is available. The expressions of this estimator are $$\dot{\hat{v}}_{S,1} = \omega_0 \hat{\phi}_{S,1} + \lambda_1(v_S - \hat{v}_{S,1})$$

$$\dot{\hat{\phi}}_{S,1} = -\omega_0 \hat{v}_{S,1} \tag{3}$$

where $\lambda_1$ is a positive design parameter referred to as the estimation gain. This estimator is referred to as the fundamental quadrature signals generator (F-QSG), as it generates estimates for the fundamental component $v_{S,1}$ of the grid voltage and its quadrature companion signal $\phi_{S,1}$. FIG. 4 illustrates a block diagram embodying the fundamental quadrature signals generator (F-QSG), according to an exemplary embodiment of the present disclosure. The F-QSG 30 in FIG. 4 includes two integrators 30.1 and 30.2. The first integrator 30.1 produces the fundamental component $v_{S,1}$ of the grid voltage, and the second integrator 30.2 produces the quadrature companion signal $\phi_{S,1}$. The opposite value of the first integrator 30.1 output multiplied by the fundamental frequency $\omega_0$ is used as the input for the second integrator 30.2. The input for the first integrator 30.1 is produced by determining the difference $\tilde{v}_S$ between the grid voltage $v_S$ and the output of the first integrator 30.1, multiplying the difference $\tilde{v}_S$ with the estimation gain $\lambda_1$, and adding the product of the output of the second integrator 30.2 and the fundamental frequency $\omega_0$ to the product of the difference $\tilde{v}_S$ with the estimation gain $\lambda_1$.

Returning to FIG. 3, the grid-side current reference $i_0^*$ can thus be computed as $$i_0^* = \frac{P}{v_{S,RMS}^2} \hat{v}_{S,1} \tag{4}$$

and in case of requiring reactive power injection, the following reference can be used:

$$i_0^* = \frac{P}{v_{S,RMS}^2} \hat{v}_{S,1} + \frac{Q}{v_{S,RMS}^2} \hat{\phi}_{S,1} \tag{5}$$

where Q represents the desired reactive power to be injected.

According to an exemplary embodiment, the main interest of the controller is to guarantee tracking of the grid-side current $i_0$ towards its reference $i_0^*$ only. That is, the tracking of the other variables towards their corresponding references is not crucial, as long as they remain bounded, and thus the controller can be further simplified by approximating the references for $i_1^*$ and $v_{C0}^*$ as follows $$v_{C0}^* \cong \hat{v}_{S,1}$$

$$i_1^* \cong i_0^* + \omega_0 C_0 \hat{\phi}_{S,1} \tag{6}$$

and by relaying in the harmonic compensation capability of a harmonics compensation mechanism (HCM), which must be able to absorb the terms that have been neglected from the references (6) above. The harmonics compensation mechanism (HCM) is discussed in more detail later on in this document. The term $\omega_0 C_0 \hat{\phi}_{S,1}$ is preserved for $i_1^*$ as this term has a considerable value incorporating the necessary phase shift to $i_1$, which may have a positive effect during transients.

The active damping injection part 21.2 in FIG. 3 includes means for forming an injection term for damping the resonance of the LCL filter by using an active damping injection mechanism (ADI). In an exemplary embodiment of the present disclosure, the separation principle [11] can be used for this part of the controller design. It allows to independently design the controller in two parts: a full state feedback part, which is based on the assumption that all the state variables are available; and an observer part, to estimate the non-available states. Then, in the controller implementation, the unavailable variables are replaced by their estimates. The observer design is discussed later on this document.

The control objective includes the design of e to guarantee perfect tracking of the grid-side current $i_0$ towards a pure sinusoidal reference $i_0^* = P\hat{v}_{S,1}/v_{S,RMS}^2$ despite of the existence of harmonic distortion in the grid voltage $v_S$, i.e., with harmonic rejection capability. Therefore, appealing to the separation principle [11], the grid-side current $i_0$ is considered to be available. A controller is designed to guarantee tracking on this variable.

Figure 5:
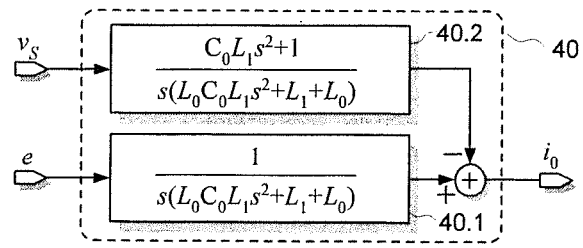
FIG. 5 illustrates a block diagram representation of the LCL filter the grid-side current is considered as output, according to an exemplary embodiment of the present disclosure.

FIG. 5 illustrates a block diagram of an exemplary embodiment of the LCL system 40 having as an output the grid-side current $i_0$ and the injected voltage e as a control input. The grid voltage $v_S$ enters as an external disturbance. The injected voltage e and the grid voltage $v_S$ transfer functions are represented by terms 40.1 and 40.2, respectively. This undamped system contains two poles on the imaginary axis located at $\pm j\omega_{res}$, and a pole in the origin, with the natural resonance frequency $\omega_{res}$ being given as $$\omega_{res} = \sqrt{\frac{L_0 + L_1}{L_0 C_0 L_1}} \quad (7)$$

A controller that stabilizes the exemplary system in FIG. 5 is given as $$e = v_S - \phi - L_0 C_0 L_1 (a_2 \ddot{i}_0 + a_1 \dot{i}_0 + a_0 \tilde{i}_0) \quad (8)$$

where $\tilde{i}_0 = i_0 - i_0^*$, with $i_0^* = P\hat{v}_{S,1}/v_{S,RMS}^2$ as defined before; $a_0$, $a_1$ and $a_2$ are positive design parameters used to introduce the required damping to guarantee stability. This procedure is known in the literature of power electronics as active damping injection, as the damping is injected without the need of passive elements. It can be shown that this controller guarantees exponential stability provided that $$\frac{L_1 + L_0}{L_0 C_0 L_1} + a_1 > \frac{a_0}{a_2}; \quad a_2 > 0; \quad a_0 > 0. \quad (9)$$

The main drawback of this controller is that it requires the knowledge of the harmonic distortion that has been concentrated in the single term $\phi$, which is defined as $$\phi = -(L_1 + L_0)\frac{P}{v_{S,RMS}^2}\dot{\hat{v}}_{S,1} - C_0 L_1 \ddot{v}_S - L_0 C_0 L_1 \frac{P}{v_{S,RMS}^2}\dddot{\hat{v}}_{S,1} \quad (10)$$

Figure 6:
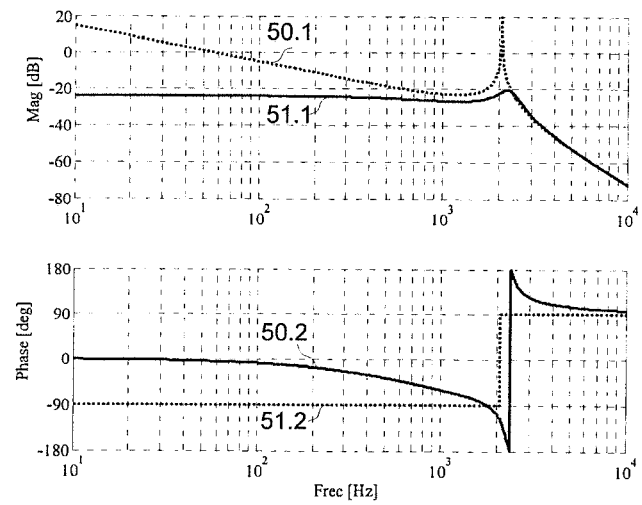
FIG. 6 illustrates the frequency responses of an ADI scheme for the LCL grid-connected inverter, according to an exemplary embodiment of the present disclosure.
Figure 7:
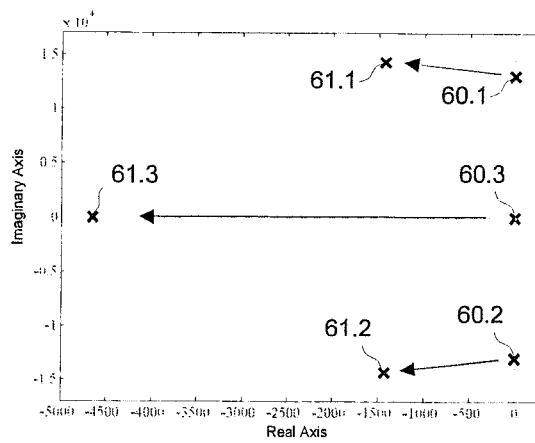
FIG. 7 illustrates the location of the poles before and after the ADI scheme is included in the LCL grid-connected inverter, according to an exemplary embodiment of the present disclosure.

FIG. 6 shows the frequency responses of the original undamped system represented by curves 50.1 and 50.2 and of the closed loop system represented by curves 51.1 and 51.2. After the introduction of the missing damping terms, the natural resonant peak of the LCL filter is considerably damped. As observed in the pole-zero map in FIG. 7, the poles 60.1 and 60.2 in the imaginary axis, as well as the pole 60.3 in the origin have all been shifted to the left to locations 61.1, 61.2 and 61.3. For a first tuning approximation, the poles 61.1, 61.2 and 61.3 of the closed loop system are considered shifted to the left in such a way that the poles 61.1 and 61.2, originally on the imaginary axis, are now located at $0.1\omega_{res} \pm j1.05\omega_{res}$, and the pole 61.3, originally at the origin, is now located at $0.4\omega_{res}$, using the natural resonance frequency $\omega_{res}$ of the original system. In other words, the real parts of the complex poles are placed at 1/10 of the resonance frequency, and the real pole is moved four times farther than the real part of the complex poles. This allows the introduction of small damping while preserving stability even for considerable variations in the system parameters. The control parameters can be tuned according to $$a_0 = 0.25\omega_{res}^3$$

$$a_1 = 0.05\omega_{res}^2$$

$$a_2 = 0.45\omega_{res} \quad (11)$$

The control method in the control system 21 in FIG. 3 also comprises means 21.3 for compensating the harmonic distortion. In exemplary embodiments where the harmonic distortion term $\phi$ is not known, the following controller is used to replace harmonic distortion term $\phi$ by its estimate $\hat{\phi}$ $$e = v_S - \hat{\phi} - L_0 C_0 L_1 (a_2 \ddot{i}_0 + a_1 \dot{i}_0 + a_0 \tilde{i}_0) \quad (12)$$

Figure 8:
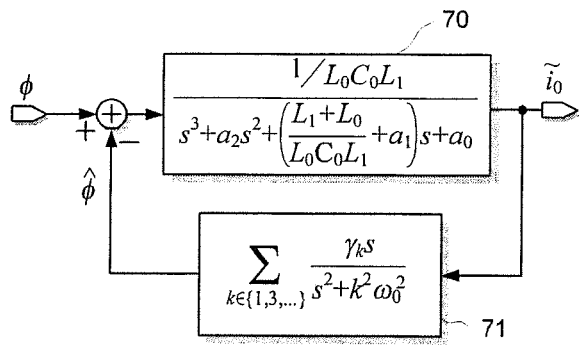
FIG. 8 illustrates a feedback loop of an HCM based on a bank of QSGs, whose design follows the internal model principle, according to an exemplary embodiment of the present disclosure.
Figure 9:
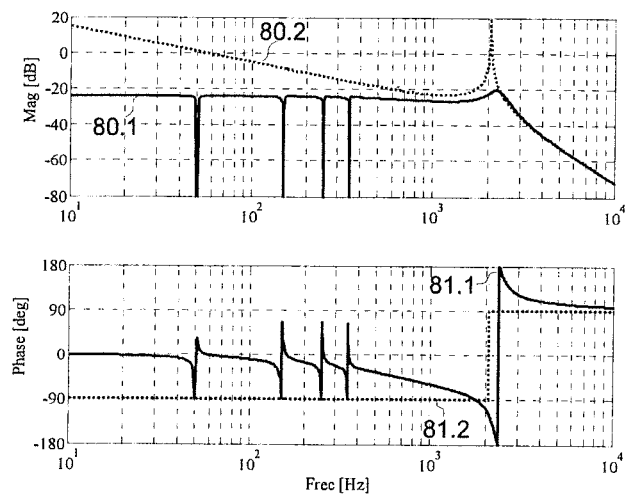
FIG. 9 illustrates the frequency responses of an ADI+HC scheme for the LCL grid-connected inverter, according to an exemplary embodiment of the present disclosure.

For the design of the variable $\hat{\phi}$, the following harmonic compensator mechanism (HCM) can be used:

$$\hat{\phi} = \sum_{k \in \{1,3,\ldots\}} \hat{\phi}_k = \sum_{k \in \{1,3,\ldots\}} \frac{\gamma_k s}{s^2 + k^2 \omega_0^2} \tilde{i}_0 \quad (13)$$

where $\gamma_k$ is a positive design parameter representing the estimation gain for the kth harmonic component $\phi_k$, and $k \in \{1, 3, 5, \ldots\}$ represents the indexes of the harmonics under concern. The set of harmonic indexes usually includes the fundamental to guarantee tracking and the higher order harmonics of the grid voltage $v_S$, for instance the odd harmonics for harmonic cancellation. FIG. 8 illustrates a block diagram representation of the closed loop system 70 with the harmonic compensator mechanism (HCM) 71, according to an exemplary embodiment of the present disclosure. The frequency response of the controlled system is given in FIG. 9, where it can be observed that the effect of the harmonic compensator mechanism (HCM) is the introduction of notches at the harmonics under concern. The solid curves 80.1 and 81.1 represent the closed loop system with the harmonic compensator mechanism (HCM), and the dashed curves 80.2 and 81.2 represent the original undamped system.

Figure 10:
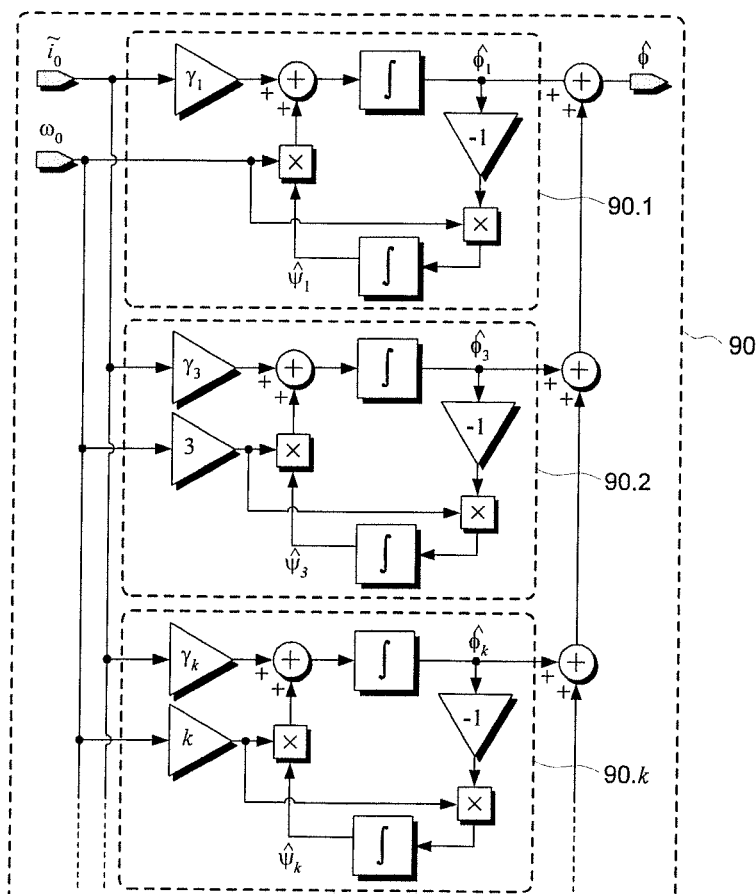
FIG. 10 illustrates an exemplary embodiment of the harmonic compensator mechanism HCM based on the concept of the k-th harmonic quadratic signals generator kth-QSG reconstructing the disturbance $\hat{\phi}$.

In exemplary embodiments where the fundamental frequency $\omega_0$ is not known, the implementation of the kth-QSG can be realized as follows $$\dot{\hat{\phi}}_k = k\omega_0 \hat{\psi}_k + \gamma_k \tilde{i}_0, \quad \forall k \in \{1, 3, 5, \ldots\}$$

$$\dot{\hat{\psi}}_k = -k\omega_0 \hat{\phi}_k \quad (14)$$

where $\omega_0$ now represents an estimate of the fundamental frequency. The estimation of $\omega_0$ can be performed using a PLL scheme, for example. An exemplary embodiment of the harmonic compensator mechanism (HCM) based on this concept is shown in FIG. 10. The harmonic compensator mechanism (HCM) 90 in FIG. 10 is a bank of quadrature signals generators (QSG) 90.1-90.$k$ tuned at the harmonics under concern. Each QSG is referred to as the kth harmonic quadratic signals generator (kth-QSG). The QSG may be implemented in a similar manner as the fundamental quadrature signals generator (F-QSG). The fundamental frequency $\omega_0$ is multiplied by the k value of the harmonic component under concern. The estimate of the harmonic disturbance $\hat{\phi}$ is composed by the sum of harmonic components $\hat{\phi}_k$, $k \in \{1, 3, 5, \ldots\}$, each generated with the corresponding kth-QSG, i.e., $$\hat{\phi} = \sum_{k \in \{1,3,\ldots\}} \hat{\phi}_k. \quad (15)$$

A first tuning rule for the estimation gains $\gamma_k$ can be stated as follows. At the low frequency range, the response of the remaining dynamics observed by the harmonic compensator mechanism (HCM) is basically a first order system with a pole located at a higher frequency. Disregarding, for simplicity, the influence of such a frequency response, the gain $\gamma_k$ can be set as $\gamma_k = 2.2/T_{kr}$, where $T_{kr}$ is the desired response time for each harmonic component, evaluated between 10% and 90% of a step response of the amplitude of the corresponding sinusoidal perturbation.

Returning to FIG. 3, the controller expression (12) can also be written in terms of more familiar variables rather than in terms of time derivatives of $\tilde{i}_0$ as follows $$e = v_S - \hat{\phi} - a_2 L_1 \tilde{i}_1 - a_1 L_1 C_0 \tilde{v}_{C0} - (a_0 - a_2 L_1) \tilde{i}_0 \quad (16)$$

where $\tilde{i}_1 = i_1 - i_1^*$ and $\tilde{v}_{C0} = v_{C0} - v_{C0}^*$. These difference terms $\tilde{v}_{C0}$ and $\tilde{i}_1$ along with the difference term $\tilde{i}_0$ can be produced from the references $i_0^*$, $i_1^*$ and $v_{C0}^*$ and their counterpart measurements or estimates in the comparison phase 21.4 of the control system 21 in FIG. 3.

As some signals used in the above controller are not available, it is possible to reconstruct them by means of an observer, such as with the observer 21.5 in FIG. 3. For instance, a reduced order observer (R-OBS) may be used. The conventional observer design method [11], or the Immersion and Invariance method (I&I) proposed in [12] can be used in the observer design. Either method yields quite similar results. However, the Immersion and Invariance method (I&I) is regarded as simpler and in some cases yields simpler expressions.

In an embodiment including a reduced order observer (R-OBS) where the capacitor voltage $v_{C0}$ and the grid-side current $i_0$ used in the above controller are not available, the observer dynamics can be given as $$C_0 \dot{\xi}_1 = -\alpha_1 (\xi_1 - e) - \xi_2 + \left(\frac{L_1}{C_0} \alpha_1^2 - \frac{L_1}{L_0} \alpha_2 + 1\right) i_1 \quad (17)$$

$$L_0 \dot{\xi}_2 = (1 + \alpha_2)\left(\xi_1 - \frac{L_1}{C_0} \alpha_1 i_1\right) - v_S - \alpha_2 e$$

where $\xi_1$ and $\xi_2$ are observer states and $\alpha_1$ and $\alpha_2$ are two design parameters. Then the signals can be reconstructed according to $$\hat{v}_{C0} = \xi_1 - \frac{L_1}{C_0} \alpha_1 i_1 \quad (18)$$

$$\hat{i}_0 = \xi_2 + \frac{L_1}{L_0} \alpha_2 i_1$$

where $\alpha_1$ and $\alpha_2$ should fulfill $\alpha_1 > 0$ and $1 + \alpha_2 > 0$ to guarantee that $\hat{v}_{C0} \to v_{C0}$, $\hat{i}_0 \to i_0$ as $t \to \infty$ exponentially.

Figure 11:
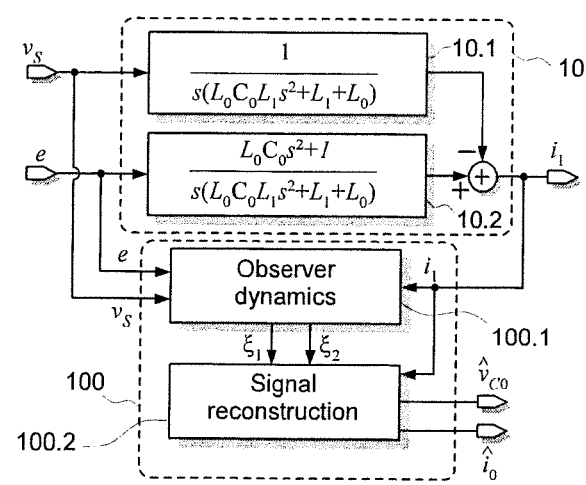
FIG. 11 illustrates the interconnection of the reduced order observer (R-OBS) and the plant, according to an exemplary embodiment of the present disclosure.

The ensemble of the observer dynamics (17) plus the expressions (18) to reconstruct the observed signals is referred to as the reduced order observer (R-OBS). FIG. 11 illustrates a block diagram of the connection of the R-OBS 100 with the plant 10 which is the same as in FIG. 2. The R-OBS 100 is divided into two parts: the observer dynamics 100.1 and the signal reconstruction 100.2. In this exemplary embodiment, the observer implementation requires the measured signals $v_S$ and $i_1$, the control signal $e$, and the system parameters $L_0$, $C_0$ and $L_1$. The three parameters now appear combined in the form of only two ratios $L_1/L_0$ and $L_1/C_0$. This may report some advantages regarding the robustness with respect to parameter uncertainties.

A first tuning rule based on the desired bandwidth $\omega_{BW}$ of the observer can be used as follows $$\alpha_1 = \sqrt{2} \omega_{BW} C_0$$

$$\alpha_2 = \omega_{BW}^2 L_0 C_0 - 1 \quad (19)$$

In exemplary embodiments including a reduced order observer (R-OBS) where signals $i_1$ and $v_{C0}$ are measured, the following simpler observer for $i_0$ based on the Immersion and Invariance method (I&I) can be used $$L_0 \dot{\xi}_1 = -\alpha_1 \xi_1 + \left(1 + \frac{C_0}{L_0} \alpha_1^2\right) v_{C0} + \alpha_1 i_1 - v_S \quad (20)$$

$$\hat{i}_0 = \xi_1 - \frac{C_0}{L_0} \alpha_1 v_{C0}$$

This observer does not require the knowledge of $L_1$. Moreover, the other parameters appear as a single quotient $C_0/L_0$ which may represent an advantage regarding the robustness against parameter uncertainties. The pole of the observer dynamics is located at $$\lambda_1 = -\frac{\alpha_1}{L_0} \quad (21)$$

which can be used for the tuning of parameter $\alpha_1$.

In exemplary embodiments including a reduced order observer (R-OBS) where signals $i_0$ and $v_{C0}$ are measured, based on the Immersion and Invariance method (I&I), the following simpler observer for $i_1$ can be used $$L_1 \dot{\xi}_1 = -\alpha_1 \xi_1 - \left(1 + \frac{C_0}{L_1} \alpha_1^2\right) i_1 + \alpha_1 v_{C0} + e \quad (22)$$

$$\hat{i}_1 = \xi_1 + \frac{C_0}{L_1} \alpha_i i_1$$

In this case the pole of the observer dynamics is located at $$\lambda_1 = -\frac{\alpha_1}{L_1} \quad (23)$$

which can be used for the tuning of parameter $\alpha_1$. This observer does not depend at all on the value of the grid-side inductance $L_0$. Other types of observers may also be used in the method according to exemplary embodiments of the present disclosure.

Figure 12:
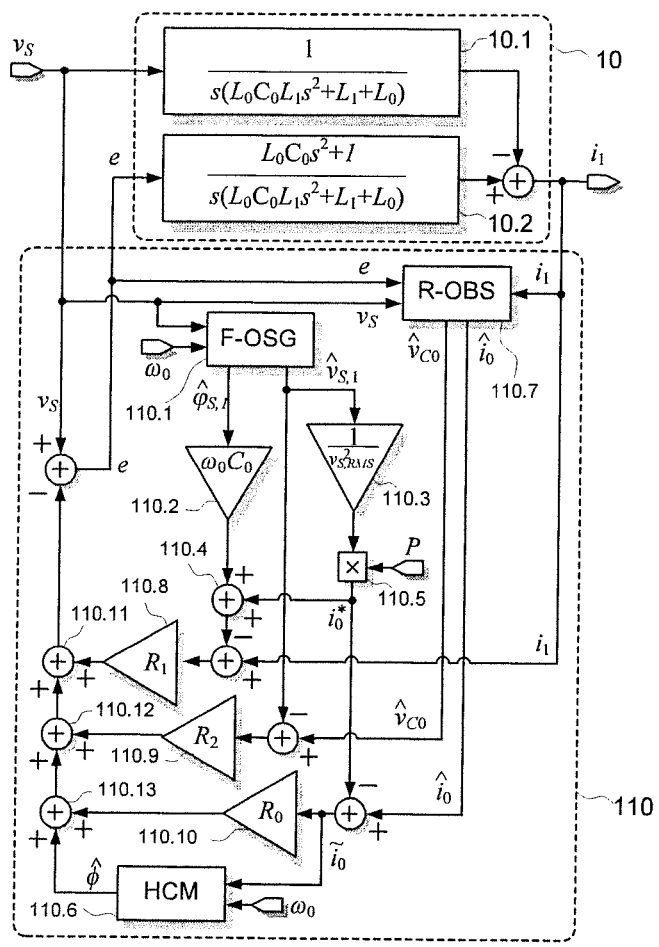
FIG. 12 illustrates an exemplary embodiment of the ADI+HC scheme and the plant.

FIG. 12 illustrates a block diagram of an exemplary embodiment of the control method according to the present disclosure. As in FIG. 2, the LCL filter 10 is represented by a sum of transfer functions, where the first term 10.1 represents the transfer function for the grid voltage $v_S$, and the second term 10.2 represents the transfer function for the converter produced voltage $e$. The subtraction of the terms 10.1 and 10.2 produces the converter-side current $i_1$, which is measured and used in the control method.

The reference generation in the control method 110 is performed by using a fundamental quadrature signals generator (F-QSG) 110.1 to produce the fundamental component $v_{S,1}$ of the grid voltage and its quadrature companion signal $\phi_{S,1}$. The fundamental quadrature signals generator (F-QSG) 110.1 is realized using equations (3). The control method 110 comprises means 110.2 to 110.5 to produce the references $i_0^*$, $i_1^*$ and $v_{C0}^*$ from the fundamental component $v_{S,1}$ of the grid voltage $v_S$ and its quadrature companion signal $\phi_{S,1}$ according equations (4, 6).

The harmonic compensation 110.6 can be performed by using a harmonics compensation mechanism (HCM) described in equation (13). The harmonic compensation mechanism (HCM) realization can be performed by using equations (14).

The non-available signals $v_{C0}$ and $i_0$ are replaced by their estimates $\hat{v}_{C0}$ and $\hat{i}_0$, respectively, using a reduced order observer 110.7, which can be realized according to equations (17 to 18). The replacement of the signals with their estimates is well supported by the separation principle stated above.

The active damping injection mechanism (ADI) described in equation (16) is used to implement the active damping. This yields the following expression for the controller $$e = v_S - \hat{\phi} - R_2(i_1 - i_0^* - \omega_0 C_0 \hat{\varphi}_{S,1}) - R_1(\hat{v}_{C0} - \hat{v}_{S,1}) - R_0(\hat{i}_0 - i_0^*) \quad (24)$$

$$\hat{\phi} = \sum_{k \in \{1,3,\ldots\}} \frac{\gamma_k s}{s^2 + k^2 \omega_0^2} (\hat{i}_0 - i_0^*)$$

where gains $R_1 = a_2 L_1$, $R_2 = a_1 L_1 C_0$ and $R_0 = a_0 L_0 C_0 L_1 - a_2 L_1$, which according to (9) must now fulfill the conditions $$\frac{L_0}{L_1}(1 + R_2) > \frac{R_0}{R_1}, \quad R_2 > 0, \quad R_1 > 0, \quad R_0 + R_1 > 0 \quad (25)$$

The new parameters are tuned according to (11) as follows $$R_1 = 0.45 \omega_{res} L_1$$

$$R_2 = 0.05 \omega_{res}^2 L_1 C_0$$

$$R_0 = 0.25 \omega_{res}^3 L_0 C_0 L_1 - R_1 \quad (26)$$

According to (25), negative values for $R_0$ are allowed. In FIG. 12, the active damping injection is realized using means 110.8 to 110.13.

According to an exemplary embodiment, any of the means described hereinabove for implementing the described aspects of the method may, for example, be a processor, a DSP, or a programmable logic device (PLD), e.g., an FPGA. The processor and/or programmable logic device can execute computer-readable instructions (e.g., a program) tangibly recorded on a non-transitory computer-readable recording medium, e.g., a ROM, hard disk drive, optical memory, flash memory, etc.

For a simulation test, the single-phase photo-voltaic (PV) inverter grid-connected through an LCL filter of FIG. 1 is considered. This system has been designed using the following parameters: $L_1 = 2$ mH, $L_0 = 833$ µH, $C_0 = 10$ µF, $C = 2200$ µF. The grid voltage $v_S$ is described according to Table 1.

TABLE 1

Description of the grid voltage harmonic components.

| Harmonic No. | Amplitude [$V_{RMS}$] | Phase [deg] |
|---|---|---|
| 1 | 230 | 0.0 |
| 3 | 50 | 14.3 |
| 5 | 25 | 8.6 |
| 7 | 15 | 5.7 |

The following parameters have been selected for the active damping part of the current controller: $R_1 = 15$, $R_2 = 1$, $R_0 = 1$, which follow the tuning guide-lines proposed in (26). For the harmonic compensation part, a selection is been made: $\gamma_1 = 300$, $\gamma_3 = 200$, $\gamma_5 = 200$, $\gamma_7 = 200$, which correspond to $T_{1r} = 7.3$ ms, and $T_{3r} = T_{5r} = T_{7r} = 11$ ms, respectively. An estimator F-QSG with known $\omega_0$, illustrated in FIG. 4, has been used instead of an adaptive scheme or a PLL, where the only parameter is tuned to $\lambda_1 = 100$, which corresponds to a $T_{fr} = 45$ ms. The design parameters for the observer have values $\alpha_1 = -0.5$ and $\alpha_2 = 0.1$, which correspond to ($\omega_{BW} = 7071$ r/s (approx. 1.1 KHz).

Figure 13:
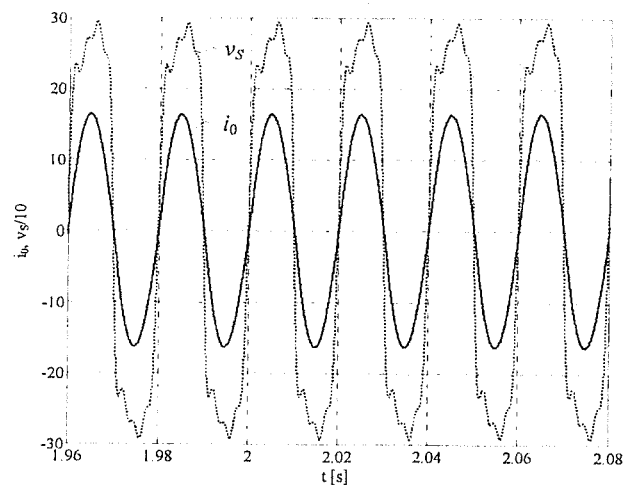
FIG. 13 illustrates the grid-side current $i_0$ tracking pure sinusoidal signal in phase with the grid voltage $v_S$ in the steady state, according to an exemplary embodiment of the present disclosure.
Figure 14:
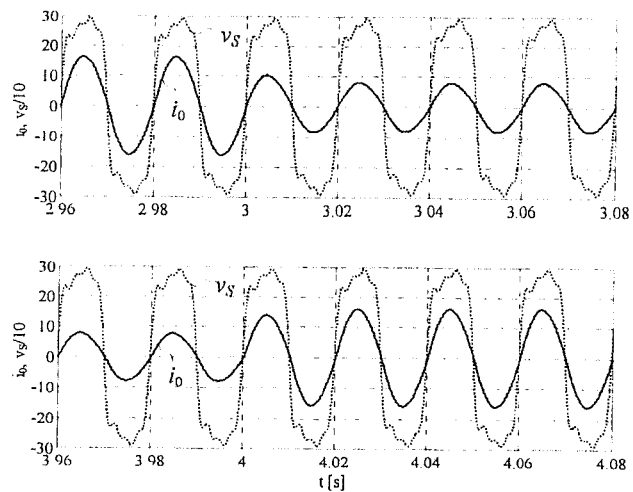
FIG. 14 illustrates that the shape of the grid-side current $i_0$ during step changes in the grid irradiation, according to an exemplary embodiment of the present disclosure.

FIG. 13 shows that, in the steady state, the grid-side current $i_0$ tracks a pure sinusoidal signal in phase with the grid voltage $v_S$, despite the high distortion on the grid voltage. Then, FIG. 14 shows that the shape of the grid-side current $i_0$ remains sinusoidal, after an almost negligible transient, during step changes in the grid irradiation from 1000 W/m² to 500 W/m² (top part of FIG. 14) and back (bottom part of FIG. 14).

Figure 15:
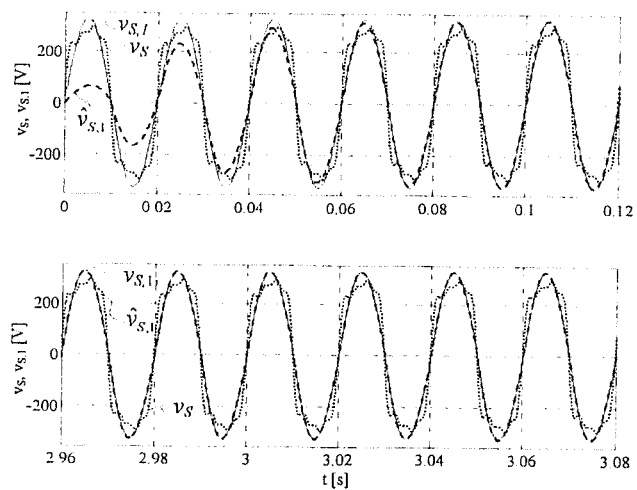
FIG. 15 illustrates the estimate of the fundamental component $\hat{v}_{S,1}$ of the grid voltage, according to an exemplary embodiment of the present disclosure.

FIG. 15 shows the estimate of the fundamental component $\hat{v}_{S,1}$ of the grid voltage, according to an exemplary embodiment of the present disclosure. The estimate is built in the F-QSG. It is shown that, after a relatively short transient during start up (top part of FIG. 15), the estimate $\hat{v}_{S,1}$ reaches the shape of a pure sinusoidal signal. It can be observed that this estimate equals the real fundamental component $v_{S,1}$ after the transient (bottom part of FIG. 15). All these take place in spite of the highly distorted grid voltage $v_S$.

Figure 16:
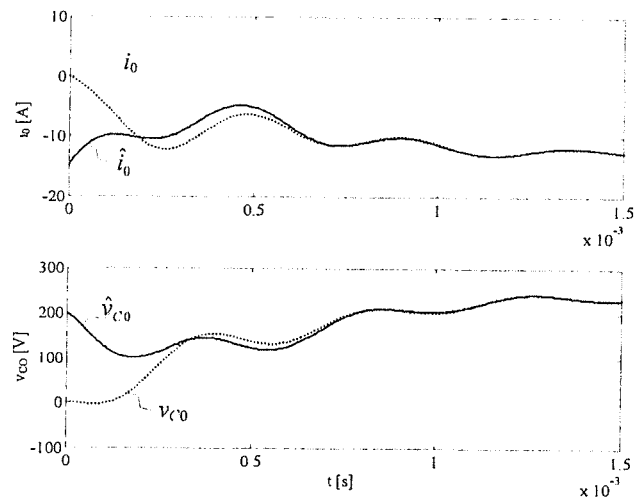
FIG. 16 illustrates the transient of the grid-side current $i_0$, grid-side current estimate $\hat{i}_0$, capacitor voltage $v_{C0}$ and capacitor voltage estimate $\hat{v}_{C0}$ at the start up, according to an exemplary embodiment of the present disclosure.

FIG. 16 shows the transient of (top part of FIG. 16) the grid-side current $i_0$ and grid-side current estimate $\hat{i}_0$, and (bottom part of FIG. 16) capacitor voltage $v_{C0}$ and capacitor voltage estimate $\hat{v}_{C0}$ at the start up, according to an exemplary embodiment of the present disclosure. An initial condition different to zero was introduced intentionally in the observed states to see this transient. It is shown that the states are perfectly reconstructed after an almost imperceptible transient.

Figure 17:
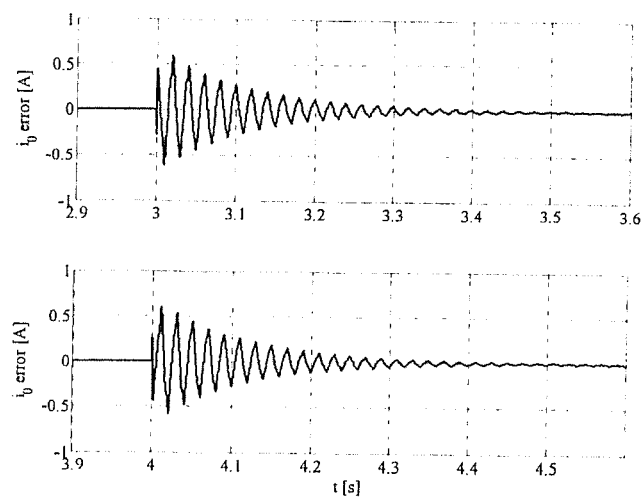
FIG. 17 illustrates the error between the real grid current $i_0$ and its reference $i_0^*$ after a relatively short transient, according to an exemplary embodiment of the present disclosure.

FIG. 17 shows that the error between the real grid current $i_0$ and its reference $i_0^*$ reaches zero after a relatively short transient, according to an exemplary embodiment of the present disclosure. In this case, a step change is introduced in the irradiation going from 1000 W/m² to 500 W/m² (top part of FIG. 17 at t=3 s) and back (bottom part of FIG. 17 at t=4 s).

Figure 18:
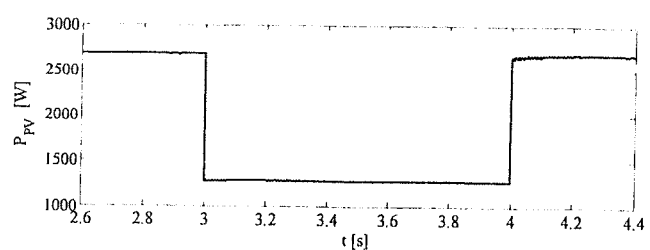
FIG. 18 illustrates transients due to the irradiation changes, according to an exemplary embodiment of the present disclosure.

The corresponding power delivered by the PV is plotted in FIG. 18, where the transients due to the irradiation changes can be observed.

Figure 19:
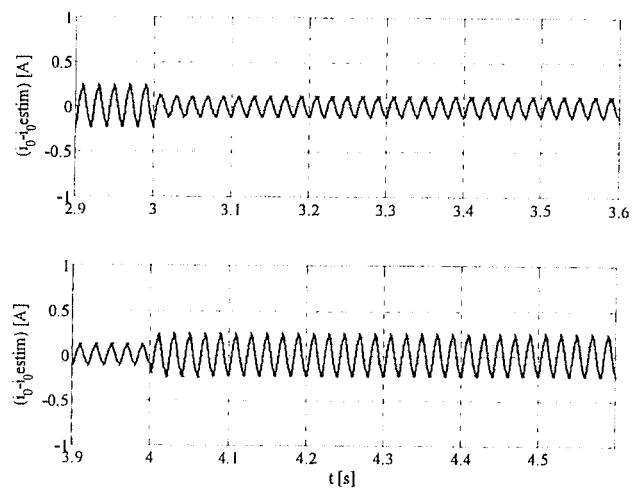
FIG. 19 illustrates transients of the grid-side current observation error $(i_0-\hat{i}_0)$ during step changes in irradiation, according to an exemplary embodiment of the present disclosure.

A 25% variation on the real grid-side inductance $L_0$ of the LCL filter has been introduced intentionally to test the robustness of the proposed scheme to variations on this system parameter. In the controller the nominal value of this parameter is used. FIG. 19 illustrates transients of the grid-side current observation error $(i_0 - \hat{i}_0)$ during step changes in irradiation from 1000 W/m² to 500 W/m² (top part of FIG. 19) and back (bottom part of FIG. 19), according to an exemplary embodiment of the present disclosure. The difference between the real and the estimated grid-side currents, i.e., $i_0 - \hat{i}_0$ is no longer zero, but there is a ripple at the fundamental frequency. This means that the parameter mismatch causes a slight phase shift with respect to the real value.

Figure 20:
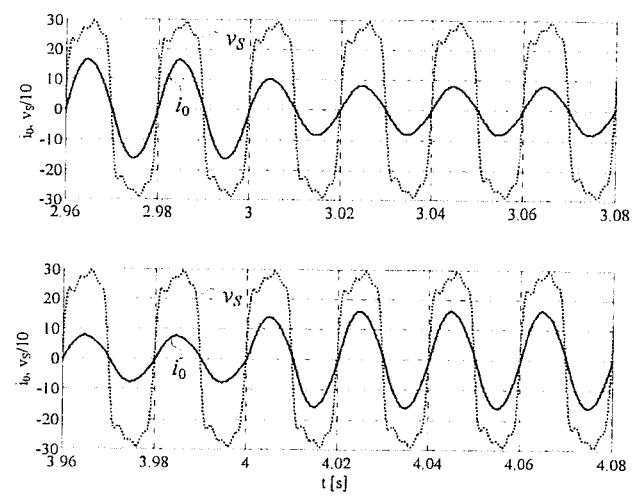
FIG. 20 which illustrates transients during step changes in irradiation, according to an exemplary embodiment of the present disclosure.

As a result, there is a slight phase shift between the real grid-side current $i_0$ and the grid voltage $v_S$ as shown in FIG. 20 which illustrates transients during a step change in irradiation (top part of FIG. 20) from 1000 W/m² to 500 W/m² and back (bottom part of FIG. 20).

It will be obvious to a person skilled in the art that, as the technology advances, the inventive concept can be implemented in various ways. The disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES

[1] M. Lindgren and J. Svensson, "Control of a voltage-source converter connected to the grid through an LCL filter—Application to active filtering," in *Proc. IEEE Power Specialists Conference PESC'98*, Fukuoka, Japan, 1998, pp. 229-235.

[2] S. Baekof-Kjaer, G. K. Andersen, C. Klumpner, F. Blaabjerg, "Control aspects of a LCL grid-connected green power inverter," in *Proc. Nordic Workshop on Pow. and Ind. Electr. NORPIE'02*, 12-14 Aug. 2002, pp. 1-7.

[3] E. Twining, and D. G. Holmes, "Grid current regulation of a three-phase voltage source inverter with an LCL input filter," *IEEE Trans. on Power Electr.*, Vol. 18(3), pp. 888-895, May 2003.

[4] R. Teodorescu, F. Blaabjerg, U. Borup, M. Liserre, "A new control structure for grid-connected LCL PV inverters with zero steady-state error and selective harmonic compensation," in *Proc. IEEE Applied Power Electronics Conference APEC'04*, 2004, Vol. 1, pp. 580-586.

[5] M. Ciobotaru, R. Teodorescu and F. Blaabjerg, "Control of single-stage single-phase PV inverter," in *Proc. European Power Electronics Conference EPE'05*, Dresden, 2005, pp. 1-10.

[6] M. Ciobotaru, R. Teodorescu and F. Blaabjerg, "Control of single-stage single-phase PV inverter," *EPE Journal*, Vol. 16(3), pp. 20-26, September 2006.

[7] V. Blasko and V. Kaura, "A novel control to actively damp resonance in input LC filter of a three-phase voltage source converter," *IEEE Trans. on Ind. Appl.*, Vol. 33(2), pp. 542-550, March/April 1997.

[8] M. Liserre, R. Teodorescu and F. Blaabjerg, "Stability of photovoltaic and wind turbine grid-connected inverters for a large set of grid impedance values," *IEEE Trans. on Power. Electron.*, Vol. 21(1), pp. 263-272, January 2006.

[9] A. Papavasiliou, S. A. Papathanassiou, S. N. Manias and G. Demetriadis, "Current control of a voltage source inverter connected to the grid via LCL filter," in *Proc. IEEE Power Electronics Specialists Conf. PESC'07*, 17-21 June, 2007, pp. 2379-2384.

[10] L. A. Serpa, S. Ponnaluri, P. M. Barbosa and J. W. Kolar, "A modified direct power control strategy allowing the connection of three-phase inverters to the grid through LCL filters," *IEEE Trans. on Ind. Appl.*, Vol 43(5), pp. 1388-1400, September/October 2007.

[11] B. Friedland, *The control handbook*, IEEE CRC Press Inc., USA, 1996.

[12] A. Astolfi and R. Ortega, "Immersion and invariance: a new tool for stabilization and adaptive control of nonlinear systems," *IEEE Trans. on Automatic Control*, Vol. 48(4), pp. 590-606, April 2003.

[13] B. Francis and W. Wonham, "The internal model principle for linear multi-variable regulators," *Applied Mathematics and Optimization*, Vol. 2, pp. 170-194, 1975.

What is claimed is:

1. A method of controlling the grid-side current of a single-phase grid-connected converter having an LCL filter connected between an output of the converter and the grid, the method comprising the steps of:

measuring, by a processor of a computing device, a grid voltage ($v_S$) and at least one signal in a group of signals consisting of a grid-side current ($i_0$), a converter-side current ($i_1$) and a capacitor voltage ($v_{C0}$);

estimating a fundamental component ($v_{S,1}$) of the grid voltage ($v_S$);

forming a grid-side current reference ($i_0^*$), a converter-side current reference ($i_1^*$) and a capacitor voltage reference ($v_{C0}^*$) for the grid-side current of the LCL filter using the estimated fundamental component of the grid voltage ($v_{S,1}$);

forming estimates for any of the non-measured signals in said group of signals;

forming a grid-side current difference term ($\tilde{i}_0$), a converter-side current difference term ($\tilde{i}_1$) and a capacitor voltage difference term ($\tilde{v}_{C0}$) from the differences between references and the measured and/or estimated values of said signals;

forming an injection term for damping the resonance of the LCL filter by using an active damping injection mechanism (ADI), in which the grid-side current difference term ($\tilde{i}_0$), the converter-side current difference term ($\tilde{i}_1$) and the capacitor voltage difference term ($\tilde{v}_{C0}$) are used;

forming an estimate of a harmonic distortion term ($\hat{\phi}$) using the grid-side current difference term ($\tilde{i}_0$); and controlling the output voltage (e) of the converter on the basis of the grid voltage, formed injection term and formed estimate of the harmonic distortion term ($\hat{\phi}$) to produce a grid side ($i_0$) current corresponding to the current reference.

2. A method as claimed in claim 1, wherein the fundamental frequency ($\omega_0$) of the grid voltage is known, and the estimating of the fundamental component ($v_{S,1}$) of the grid voltage comprises:

determining a value for a quadrature companion signal ($\phi_{S,1}$) by integrating the product of the opposite value of fundamental component of the grid voltage ($v_{S,1}$) and the fundamental frequency of the grid voltage ($\omega_0$);

determining the difference ($\tilde{v}_S$) between the grid voltage and the fundamental component of the grid voltage ($v_{S,1}$);

adding the product of the quadrature companion signal ($\phi_{S,1}$) and the fundamental frequency of the grid voltage (at) to the product of the difference ($\tilde{v}_S$) and the estimation gain ($\lambda_1$); and determining the value of the fundamental component of the grid voltage ($v_{S,1}$) by integrating the sum of the addition.

3. A method as claimed in claim 1, wherein the magnitude of the current reference ($i_0^*$) for the grid-side current is proportional to an approximate of the delivered power (P).

4. A method as claimed in claim 1, wherein:

the fundamental frequency ($\omega_0$) of the grid voltage and the quadrature companion signal ($\phi_{S,1}$) are known;

the capacitor voltage reference ($v_{C0}^*$) is approximated by the fundamental component of the grid voltage ($v_{S,1}$); and the converter-side current reference ($i_1^*$) is approximated by the product of the capacitor capacitance ($C_0$), fundamental frequency ($\omega_0$) and the quadrature companion signal ($\phi_{S,1}$) added to the grid-side current reference ($i_0^*$).

5. A method as claimed in claim 1, wherein the converter-side current ($i_1$) is measured and the grid-side current ($i_0$) and the capacitor voltage ($v_{C0}$) are estimated using an observer, where the observer dynamics are given as:

$$C_0 \dot{\xi}_1 = -\alpha_1(\xi_1 - e) - \xi_2 + \left(\frac{L_1}{C_0}\alpha_1^2 - \frac{L_1}{L_0}\alpha_2 + 1\right)i_1$$

$$L_0 \dot{\xi}_2 = (1+\alpha_2)\left(\xi_1 - \frac{L_1}{C_0}\alpha_1 i_1\right) - v_S - \alpha_2 e,$$

where $\xi_1$ and $\xi_2$ are observer states, $L_1$ is the converter-side inductor inductance, $C_0$ is the capacitor capacitance and $L_0$ is the grid-side inductor inductance of the LCL filter and $\omega_{res}$ is the natural resonance frequency and
a grid-side current estimate ($\hat{i}_0$) and a capacitor voltage estimate ($\hat{v}_{C0}$) are reconstructed according to:

$$\hat{v}_{C0} = \xi_1 - \frac{L_1}{C_0}\alpha_1 i_1$$

$$\hat{i}_0 = \xi_2 + \frac{L_1}{L_0}\alpha_2 i_1$$

where $\alpha_1$ and $\alpha_2$ are two design parameters which fulfill $\alpha_1 > 0$ and $1+\alpha_2 > 0$.

6. A method as claimed in claim 5, wherein the tuning of two design parameters $\alpha_1$ and $\alpha_2$ is based on a desired bandwidth ($\omega_{BW}$) and said parameters are tuned according to:

$\alpha_1 = \sqrt{2}\omega_{BW} C_0$ $\alpha_2 = \omega_{BW}^2 L_0 C_0 - 1$.

7. A method as claimed in claim 1, wherein the converter-side current ($i_1$) and the capacitor voltage ($v_{C0}$) are measured and the grid-side current ($i_0$) is estimated using an observer, where
the observer dynamics are given as:

$$L_0 \dot{\xi}_1 = -\alpha_1 \xi_1 + \left(1 + \frac{C_0}{L_0}\alpha_1^2\right)v_{C0} + \alpha_1 i_1 - v_S,$$

where $\xi_1$ is an observer coefficient, $C_0$ is the capacitor capacitance and $L_0$ is the grid-side inductor inductance of the LCL filter and $\omega_{res}$ is the natural resonance frequency, and
a grid-side current estimate (I) is reconstructed according to:

$$\hat{i}_0 = \xi_1 - \frac{C_0}{L_0}\alpha_1 v_{C0}$$

where $\alpha_1$ is a design parameter.

8. A method as claimed in claim 7, wherein the tuning of the design parameter $\alpha_1$ is based on a desired bandwidth ($\omega_{BW}$), and said parameter is tuned according to:

$$\lambda_1 = -\frac{\alpha_1}{L_0}$$

where $\lambda_1$ is the pole of the observer dynamics.

9. A method as claimed in claim 1, wherein the grid-side current ($i_0$) and the capacitor voltage ($v_{C0}$) are measured and the converter-side current ($i_1$) is estimated using an observer, where
the observer dynamics are given as:

$$L_1 \dot{\xi}_1 = -\alpha_1 \xi_1 - \left(1 + \frac{C_0}{L_1}\alpha_1^2\right)i_1 + \alpha_1 v_{C0} + e,$$

where $\xi_1$ is an observer coefficient, $C_0$ is the capacitor capacitance and $L_1$ is the converter-side inductor inductance of the LCL filter and $\omega_{res}$ the natural resonance frequency, and
a grid-side current estimate ($\hat{i}_0$) is reconstructed according to:

$$\hat{i}_1 = \xi_1 + \frac{C_0}{L_1}\alpha_i i_1$$

where $\alpha_1$ is a design parameter.

10. A method as claimed in claim 9, wherein the tuning of the design parameter $\alpha_1$ is based on a desired bandwidth ($\omega_{BW}$), and said parameter is tuned according to:

$$\lambda_1 = -\frac{\alpha_1}{L_1}$$

where $\lambda_1$ is the pole of the observer dynamics.

11. A method as claimed in claim 1, wherein the forming of the injection term comprises:
multiplying the grid-side current difference term ($\tilde{i}_0$) by a constant $R_0$;
multiplying the converter-side current difference term ($\tilde{i}_1$) by a constant $R_1$;
multiplying the capacitor voltage difference term ($\tilde{v}_{C0}$) by a constant $R_2$; and
forming the injection term by adding the products together.

12. A method as claimed in claim 11, wherein the constants are defined as $R_1 = 0.45 \omega_{res} L_1$ $R_2 = 0.05 \omega_{res}^2 L_1 C_0$ $R_0 = 0.25 \omega_{res}^3 L_0 C_0 L_1 - R_1$ where $L_1$ is the converter-side inductor inductance, $C_0$ is the capacitor capacitance and $L_0$ is the grid-side inductor inductance of the LCL filter and $\omega_{res}$ is the natural resonance frequency.

13. A method as claimed in claim 1, wherein the forming of the estimate of the harmonic distortion term ($\hat{\phi}$) comprises summation of k harmonic components ($\hat{\phi}_1 - \hat{\phi}_k$).

14. A method as claimed in claim 1, wherein the fundamental frequency ($\omega_0$) of the grid voltage is known, and forming of a harmonic component with an index number k ($\hat{\phi}_k$) comprises:
determining a value for a quadrature companion signal ($\hat{\psi}_k$) by integrating the product of the opposite value of the harmonic component ($\hat{\phi}_k$) and the fundamental frequency ($\omega_0$) of the grid voltage multiplied by the value of index number k;
adding the product of quadrature companion signal ($\hat{\psi}_k$) and the fundamental frequency of the grid voltage ($\omega_0$) multiplied by the fundamental frequency ($\omega_0$) to the product of the grid-side current difference ($\tilde{i}_0$) and the design parameter ($\gamma_k$); and determining the value of the harmonic component ($\hat{\phi}_k$) by integrating the sum of the addition.

15. A method as claimed in claim 14, wherein
the design parameter ($\gamma_k$) is set as $\gamma_k=2.2/T_{kr}$, where $T_{kr}$ is the desired response time for each kth harmonic component, evaluated between 10% and 90% of a step response of the amplitude of the corresponding sinusoidal perturbation.

16. A method as claimed in claim 1, wherein the injection voltage (e) is formed by subtracting the estimate of harmonic distortion term ($\hat{\phi}$) and the injection term from the grid voltage ($v_S$).

17. A method as claimed in claim 2, wherein:
the fundamental frequency ($\omega_0$) of the grid voltage and the quadrature companion signal ($\phi_{S,1}$) are known;
the capacitor voltage reference ($v_{C0}^*$) is approximated by the fundamental component of the grid voltage ($v_{S,1}$); and
the converter-side current reference ($i_1^*$) is approximated by the product of the capacitor capacitance ($C_0$), fundamental frequency ($\omega_0$) and the quadrature companion signal ($\phi_{S,1}$) added to the grid-side current reference ($i_0^*$).

18. A method as claimed in claim 17, wherein the converter-side current ($i_1$) is measured and the grid-side current ($i_0$) and the capacitor voltage ($v_{C0}$) are estimated using an observer, where
the observer dynamics are given as:

$$C_0\dot{\xi}_1 = -\alpha_1(\xi_1 - e) - \xi_2 + \left(\frac{L_1}{C_0}\alpha_1^2 - \frac{L_1}{L_0}\alpha_2 + 1\right)i_1$$

$$L_0\dot{\xi}_2 = (1+\alpha_2)\left(\xi_1 - \frac{L_1}{C_0}\alpha_1 i_1\right) - v_S - \alpha_2 e,$$

where $\xi_1$ and $\xi_2$ are observer states, $L_1$ is the converter-side inductor inductance, $C_0$ is the capacitor capacitance and $L_0$ is the grid-side inductor inductance of the LCL filter and $\omega_{res}$ is the natural resonance frequency and
a grid-side current estimate ($\hat{i}_0$) and a capacitor voltage estimate ($\hat{v}_{C0}$) are reconstructed according to:

$$\hat{v}_{C0} = \xi_1 - \frac{L_1}{C_0}\alpha_1 i_1$$

$$\hat{i}_0 = \xi_2 + \frac{L_1}{L_0}\alpha_2 i_1$$

where $\alpha_1$ and $\alpha_2$ are two design parameters which fulfill $\alpha_1>0$ and $1+\alpha_2>0$.

19. A method as claimed in claim 17, wherein the converter-side current ($i_1$) and the capacitor voltage ($v_{C0}$) are measured and the grid-side current ($i_0$) is estimated using an observer, where
the observer dynamics are given as:

$$L_0\dot{\xi}_1 = -\alpha_1\xi_1 + \left(1 + \frac{C_0}{L_0}\alpha_1^2\right)v_{C0} + \alpha_1 i_1 - v_S,$$

where $\xi_1$ is an observer coefficient, $C_0$ is the capacitor capacitance and $L_0$ is the grid-side inductor inductance of the LCL filter and $\omega_{res}$ is the natural resonance frequency and
a grid-side current estimate ($\hat{i}_0$) is reconstructed according to:

$$\hat{i}_0 = \xi_1 - \frac{C_0}{L_0}\alpha_1 v_{C0}$$

where $\alpha_1$ is a design parameter.

20. A method as claimed in claim 17, wherein the grid-side current ($i_0$) and the capacitor voltage ($v_{C0}$) are measured and the converter-side current ($i_1$) is estimated using an observer, where
the observer dynamics are given as:

$$L_1\dot{\xi}_1 = -\alpha_1\xi_1 - \left(1 + \frac{C_0}{L_1}\alpha_1^2\right)i_1 + \alpha_1 v_{C0} + e,$$

where $\xi_1$ is an observer coefficient, $C_0$ is the capacitor capacitance and $L_1$ is the converter-side inductor inductance of the LCL filter and $\omega_{res}$ is the natural resonance frequency, and
a grid-side current estimate ($\hat{i}_0$) is reconstructed according to:

$$\hat{i}_1 = \xi_1 + \frac{C_0}{L_1}\alpha_i i_1$$

where $\alpha_1$ is a design parameter.

21. A method as claimed in claim 17, wherein the forming of the injection term comprises:
multiplying the grid-side current difference term ($\tilde{i}_0$) by a constant $R_0$;
multiplying the converter-side current difference term ($\tilde{i}_1$) by a constant $R_1$;
multiplying the capacitor voltage difference term ($\tilde{v}_{C0}$) by a constant $R_2$; and
forming the injection term by adding the products together, and
wherein the constants are defined as $R_1=0.45\omega_{res}L_1$ $R_2=0.05\omega_{res}^2 L_1 C_0$ $R_0=0.25\omega_{res}^3 L_0 C_0 L_1 - R_1$ where $L_1$ is the converter-side inductor inductance, $C_0$ is the capacitor capacitance and $L_0$ is the grid-side inductor inductance of the LCL filter and $\omega_{res}$ is the natural resonance frequency.

22. A method as claimed in claim 17, wherein the forming of the estimate of the harmonic distortion term ($\hat{\phi}$) comprises summation of k harmonic components ($\hat{\phi}=\hat{\phi}_k$).

23. A method as claimed in claim 15, wherein the injection voltage (e) is formed by subtracting the estimate of harmonic distortion term ($\hat{\phi}$) and the injection term from the grid voltage ($v_S$).

24. A converter in association with a LCL filter, the converter comprising:
means for measuring a grid voltage ($v_S$) and at least one signal in a group of signals consisting of a grid-side current ($i_0$), a converter-side current ($i_1$) and a capacitor voltage ($v_{C0}$), the means for measuring including at least one processor of a computing device;

means for estimating a fundamental component ($v_{S,1}$) of the grid voltage ($v_S$);

means for forming a grid-side current reference ($i_0^*$), a converter-side current reference ($i_1^*$) and a capacitor voltage reference ($v_{C0}^*$) for the grid-side current of the LCL filter using the estimated fundamental component of the grid voltage ($v_{S,1}$);

means for forming estimates for any of the non-measured signals in said group of signals;

means for forming a grid-side current difference term ($\tilde{i}_0$), a converter-side current difference term ($\tilde{i}_1$) and a capacitor voltage difference term ($\tilde{v}_{C0}$) from the differences between the references and measured/estimated values of said signals;

means for forming an injection term for damping the resonance of the LCL filter by using an active damping injection mechanism (ADI), in which the grid-side current difference term ($\tilde{i}_0$), the converter-side current difference term ($\tilde{i}_1$) and the capacitor voltage difference term ($\tilde{v}_{C0}$) are used;

means for forming an estimate of a harmonic distortion term ($\hat{\phi}$) using the grid-side current difference term ($\tilde{i}_0$); and means for controlling the output voltage (e) of the converter on the basis of the grid voltage, formed injection term and formed estimate of the harmonic distortion term ($\hat{\phi}$) for producing a grid side ($i_0$) current corresponding to the current reference.

* * * * *